United States Patent [19]

Layman

[11] 4,152,473
[45] May 1, 1979

[54] SYNTHETIC TURF SEAMS

[76] Inventor: Bruce W. Layman, 2114 W. Kingsley Rd., Garland, Tex. 75041

[21] Appl. No.: 726,433

[22] Filed: Sep. 27, 1976

[51] Int. Cl.$^2$ ............................................. A01N 3/00
[52] U.S. Cl. ........................................ 428/17; 156/66;
156/284; 156/285; 156/304; 156/305; 156/306;
156/307; 428/62; 428/82; 428/95; 428/346;
428/350; 428/913
[58] Field of Search ...................... 428/17, 62, 82, 95,
428/346, 350, 913; 156/66, 284, 285, 304, 305,
306, 307

[56] References Cited
U.S. PATENT DOCUMENTS

| 3,969,564 | 7/1976 | Carder | 428/62 |
| 3,974,312 | 8/1976 | Stevens | 428/17 |

*Primary Examiner*—Marion E. McCamish
*Attorney, Agent, or Firm*—Hubbard, Thurman, Turner, Tucker & Glaser

[57] ABSTRACT

A seam and method for forming such seam to join pieces of synthetic turf material together are disclosed. In the disclosed method, edges of synthetic turf material, having a polymeric backing thereon, are abutted together and the abutted edges are positioned over a reinforcing tape material. The reinforcing tape material is a fabric strip that is coated with a polymeric material that is substantially the same as the polymeric material forming the backing of the synthetic turf. A volatile solvent material, capable of dissolving the polymeric material forming the backing of the synthetic turf, and the coating on the reinforcing tape is thereafter applied to at least a portion of the abutted edges and the adjacent surface of the reinforcing tape. Pressure is applied to urge the abutted edges into contact with the surface of the reinforcing tape and the volatile solvent is allowed to evaporate, thereby forming the seam, having improved structural properties.

10 Claims, 2 Drawing Figures

SYNTHETIC TURF SEAMS

BACKGROUND OF THE INVENTION

This invention relates to a seam and a method for forming the seam to join pieces of synthetic turf material together. In another aspect, this invention relates to an improved seam and method for forming it whereby synthetic turf materials, having a polymeric backing, are joined together. In yet another aspect, this invention relates to a seam and method for forming the seam which is exceptionally strong and wear-resistant in outdoor installations.

In recent years, synthetic turf materials have been widely used to cover athletic fields, parade grounds, playgrounds, highway medians, areas surrounding swimming pools, patios, and the like. Such synthetic turf materials normally simulate a well manicured, natural grass surface in that the synthetic turf material is made up of a multitude of upstanding ribbon-like fibers that are secured to a base or a substrate. Such fibers, as nylon, polypropylene, polyvinyl chloride and the like, have been widely used as the material for forming the upstanding grass leaf-like ribbons. Because of the durability of such materials of construction, it is possible to produce a simulated grass surface, or a synthetic turf material that stands up well under extremely harsh conditions. Such durable surfaces are now widely used for the surfaces of athletic playing fields and the like, wherein the synthetic turf is exposed to the grinding, abrasive, and twisting forces, caused by the shoes of athletes, animals, and the like, as they walk or run across the surface of the synthetic turf.

With the development of synthetic turf materials in recent years, the strength and durability properties of the synthetic turf materials have been improved to a point where such turf materials stand up well under even the most extreme wear conditions out of doors. One particularly troublesome problem does plague the synthetic turf industry in that the synthetic turf materials are manufactured in long continuous rolls of material and it is necessary to join the materials together for final installation. The installation of synthetic turf material is some way resembles the installation of carpet material in that the synthetic turf material is unrolled, cut to the desired sizes, and the adjacent pieces of synthetic turf material are brought together by some manner and means. Many different techniques have been utilized for the installation of synthetic turf materials. One widely accepted method for joining synthetic turf materials together, along the sides and edges of the turf material, has been to simply glue or adhere the individual pieces of the turf material to a solid base or substrate, such as a wood, concrete, asphalt, or other substrate. Such a method of installation is grossly inadequate in those instances where a pad or cushion layer must be disposed between the synthetic turf material and the relatively rigid and firm substrate. Even in those instances where there is no necessity for installing a pad or layer of cushioning material between the synthetic turf material and the rigid base, problems have still developed in that the seam or the area along the abutting edges of adjacent pieces of the synthetic turf material is very difficult to seal and water, dirt, and other materials invariably migrate into the seam. Over prolonged periods of time, such water and dirt will cause a destruction of a portion of the seam by means of the water and other material creeping along minute crevices, cracks, or holes between the base of the synthetic turf material and the supporting wood, concrete, asphalt, etc., anchor structure.

The problems of forming a long lasting durable seam between adjacent pieces of synthetic turf material become more acute when a pad or a layer of cushioning material is disposed between the synthetic turf material and the firm supporting structure. In those instances, it is virtually impossible to form a seam between the adjacent pieces of the synthetic turf material that will resist wear from the users, as well as the ravages of rain, sleet, snow, sunlight and the like. Various techniques have been utilized to form seams between synthetic turf materials that are applied over a pad or layer of cushioning material. Such techniques include a conventional sewing technique wherein the adjacent pieces of the turf material are actually sewn together, usually from the back. Such a procedure is extremely tedious and time consuming and often times, affects the overall appearance of the installed synthetic turf material. The sewing technique further produces localized stress points around the points where the thread or yarn is passed through the synthetic turf material. Overall, such a sewing technique has not been widely accepted in the installation of synthetic turf materials.

Another technique that has been utilized for the installation of synthetic turf materials utilizes a heat sealing technique wherein some type of a tape material is positioned beneath the abutted edges of the synthetic turf material to be seamed. By application of heat to the surface of the tape and the bottom portion of the abutted seams, the temperature can be raised to a point where at least a portion of the surface of the tape or the lower portion of the abutted seams will soften and become tacky. Thereafter, by the application of pressure to compress the lower portion of the abutted edges with the surface of the tape material, some fusion or adhesion will take place to thereby form a bond between the abutted edges of the synthetic turf material and the surface of the heat sealing tape. This technique has been widely used but has been found grossly unacceptable because it is extremely difficult to heat the materials to the precise softening point without damage to the surface of the synthetic turf material. The problems connected with heating the heat sealing tape are compounded in that most installations of synthetic turf are made outdoors and under varying temperature conditions. The resulting seams are non-uniform and have a high degree of failure, especially in outdoor use on athletic fields.

Still another technique that has been utilized to join the abutted edges of synthetic turf material together is by application of various types of glue, mastic material and adhesive material. While this particular technique is widely used, it has certain inadequacies in that most seams produced with such glues, mastics, or adhesives will fail when they are subjected to use and to the elements, such as rain, snow, sleet, sunlight and temperature changes. Even the widely acclaimed epoxy type cements fail under normal usage because of temperature changes and water seeping into various voids and other cracks in the epoxy cement layer will gradually weaken and deteriorate the bond.

It is, therefore, apparent that there is a need for an improved seam and method for forming the seam between the abutted edges of synthetic turf material. It is also apparent that there is a need for a seam and method for installing it that can be quickly and easily installed under field conditions and maintain its strength over long periods of use and exposure to the elements.

SUMMARY OF THE INVENTION

Accordingly, it is an object of this invention to provide an improved seam and method for forming the seam to join pieces of synthetic turf material together. It is another object of this invention to provide an improved seam and method for forming a seam to join synthetic turf materials having a polymeric backing thereon. It is yet another object of this invention to provide a seam and method for forming a seam to join synthetic turf materials together in a waterproof manner.

Other aspects, objects and advantages of this invention will be apparent to those skilled in the art from the following description and appended claims.

In the instant invention, synthetic turf materials, having a polymeric material backing thereon, are joined together by abutting the edges of the turf materials together and positioning a reinforced tape beneath the abutted edges. The reinforced tape is a fabric tape that is coated with a polymeric material that is substantially the same as the backing on the synthetic turf material to be joined together. Upon positioning the tape beneath the abutted edges, a solvent material for the polymeric material is applied to at least a portion of the reinforced tape adjacent the abutted edges of the synthetic turf material and a downward force is applied along the upper portion of the abutted edges to thereby urge the abutted edges into contact with the reinforced tape. The action of the solvent on the surface of the reinforced tape and the underside of the synthetic turf material will cause a fusion of the abutted edges of the turf material with the surface of the reinforced tape. Upon evaporation of the solvent from the seam, a strong, durable and waterproof seam is formed.

DESCRIPTION OF PREFERRED EMBODIMENTS

Figure 1:
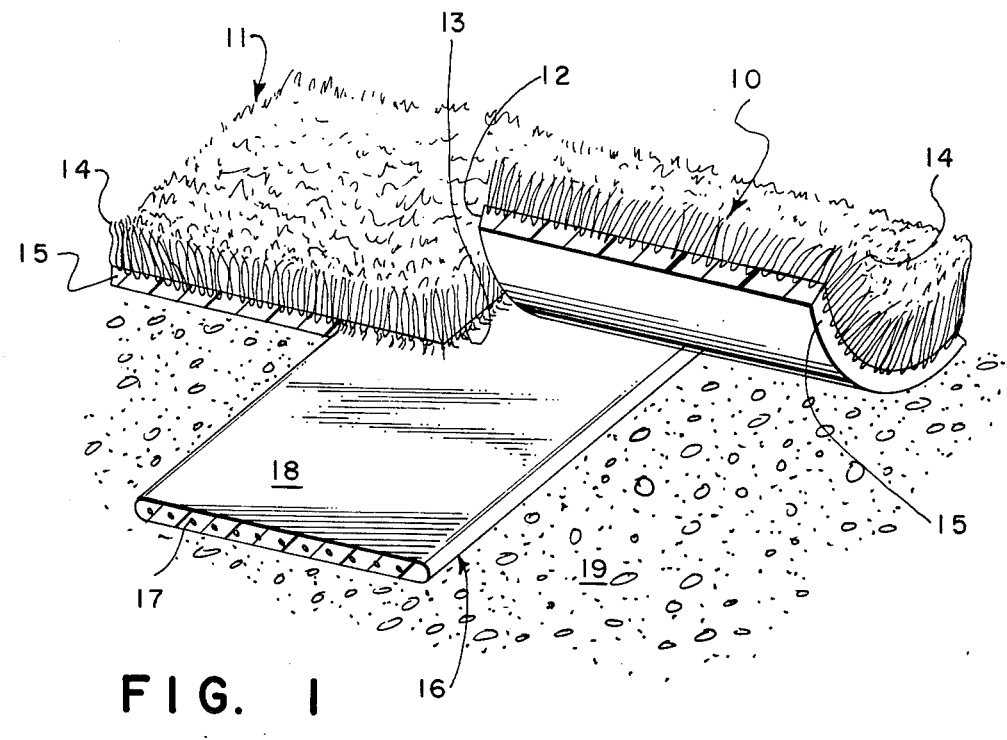
FIG. 1 is a perspective view of two pieces of synthetic turf material as they are bonded to a reinforced tape material to form the seam of this invention.

The preferred embodiments of this invention can best be described by referring to the drawings. FIG. 1 is a perspective view of the installation of two pieces of synthetic turf material to form the seam of this invention. In FIG. 1, turf section 10 and turf section 11 are positioned such that edge 12 of turf section 10 and edge 13 of turf section 11 abut against each other. Normally, in the installation of a large area, such as an athletic field, edge 12 and edge 13 will be the straight side edges of the turf sections and will fit in close relationship along the entire length of each of turf sections 10 and 11. Turf sections 10 and 11 have a multitude of ribbons or filaments 14 extending upwardly from the surface thereof. This multitude of upstanding filaments or ribbons can be sheared or cut to a desired length to give the top surface of the turf section a grasslike appearance. As well known in the art, the filaments or ribbons can be colored to any desired color to give the appearance of natural grass.

Disposed along the underside of turf sections 10 and 11 is a polymeric backing material 15. Polymeric backing 15 can be any known polymer that is utilized in the manufacture of synthetic turf material. Normally, synthetic turf materials, especially those to be installed out of doors, have a polymeric backing or coating that forms an integral part of the synthetic turf material to lend dimensional stability to the turf material and to assist in holding the individual upstanding filaments or ribbons 14 in place. In one particularly preferred embodiment of this invention, the synthetic turf sections 10 and 11 are of the type of materials known as "tufted" materials wherein lengths of filaments or ribbons 14 are punched into or inserted into apertures in a base material such as a woven polymeric sheet or skrim of material and thereafter, a suitable polymeric coating is applied to the back of the sheet to hold the individual ribbons or filaments in place. In such a well known manufacturing process, filaments or ribbons 14 can be inserted into a base and thereafter, molten polyvinyl chloride or a solution of polyvinyl chloride in a volatile solvent can be poured across or contacted with the back side of the tufted sheet to thereby allow the molten or dissolved polyvinyl chloride to penetrate and permeate the individual tufted ribbons or filaments. Thus, the molten or dissolved polymeric material will flow into the structure to thereby coat and surround the base of each of the tufted filaments or ribbons and when the polymeric material is allowed to solidify or when the solvent is allowed to evaporate, the individual ribbons or filaments 14 will be securely anchored to and affixed to the base to thereby form a very durable carpet-like structure with the upstanding filaments or ribbons held securely in place. As illustrated in the FIGURES, polymeric backing 15 securely holds and anchors the individual ribbons and filaments in place.

In the instant invention, as mentioned above, edges 12 and 13 of synthetic turf sections 10 and 11 are abutted together and reinforced tape material 16 is positioned beneath the abutted edges. Reinforced tape 16 comprises a tape material with a relatively flexible high strength material 17 disposed in the center thereof with a polymeric coating 18 coating on at least one side of fabric section 17. Since reinforcing tape 16 will form an integral part of the seam of this invention, it is, of course, desirable to utilize a reinforced tape material that has sufficiently high strength to produce a seam having good dimensional stability and durability where it will not separate or pull apart under normal use. Preferably, flexible reinforcing tape 16 will be a tape material having reinforcing fabric 17, such as woven or nonwoven fiberglass, nylon filaments, polypropolene filaments, polyester filaments, fine steel wires, and the like, running therethrough. Polymeric coating 18 will be at least on the side of the reinforced tape that is adjacent the aubutted edges 12 and 13 to be joined. Preferably, however, polymeric coating 18 will be on both sides on reinforcing belt 17. In a preferred embodiment, polymeric coating 18, on reinforcing tape 16 will be essentially the same polymeric coating as polymeric coating 15 which is on the back of synthetic turf sections 10 and 11.

When edges 12 and 13 are abutted together, reinforcing tape 16 is positioned beneath the edges and a solvent for polymeric coating 18 and polymeric coating 15 is applied to the area to be bonded together. It is important that the solvent utilized in the instant invention is a solvent that is common to polymeric coating 18 and polymeric coatings 15 whereby the complete bonding of the edges of synthetic turf sections 10 and 11 to reinforcing tape 16 can be accomplished without the presence of voids, cracks, and the like. Therefore, it is highly desirable to utilize a reinforced tape material 16 that has polymeric coating 18 essentially the same as polymeric coatings 15 on the backs of synthetic turf material sections 10 and 11.

Once the abutted edges are in place with the reinforced tape section 16 positioned beneath the edges, the solvent can be applied to the surface of reinforced tape 16 adjacent the lower portions of abutted edges 12 and 13. Of course, it will be appreciated that the solvent can also be applied to the underside portions of edges 12 and 13. When the solvent has been applied to wet the surface of reinforcing tape 18 as well as the bottom portions of edges 12 and 13, the edges 12 and 13 are forced downwardly in contact with the wetted surface of reinforcing tape 16. Thus, by applying a force along at least a portion of the edges of the synthetic turf material to thereby urge the abutted edges into contact with the solvent coated surface of reinforcing tape 16, air and the like can be forced from the locale of the seam and the solvent will soften and dissolve polymeric coating 18 as well as polymeric coatings 15 along the underside of synthetic turf sections 10 and 11. By utilizing a volatile solvent, the solvent will evaporate from the illustrated sections of the synthetic turf to leave behind a thoroughly bonded seam, having no cracks or voids and possessing a structural strength that is, in many instances, stronger than the synthetic turf material, itself, without the seam.

Figure 2:
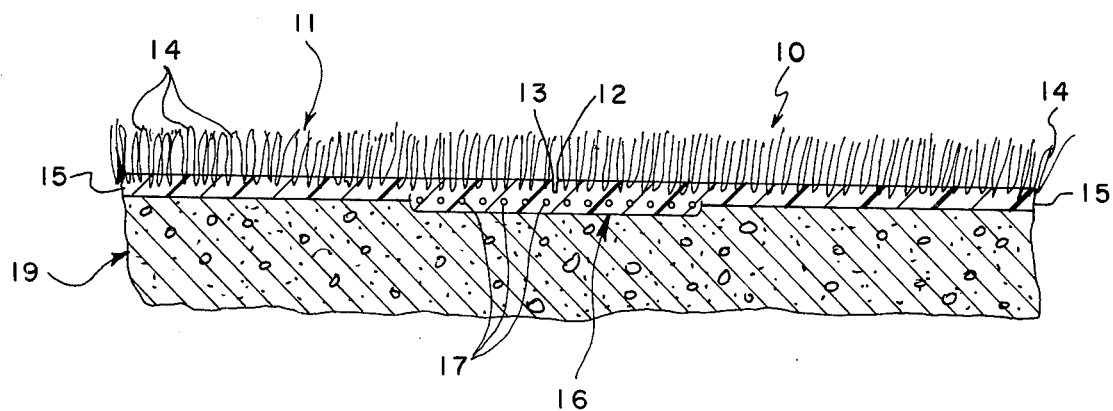
FIG. 2 is a cross-sectional view of a seam made in accordance with the instant invention showing the relative positions of the two pieces of synthetic turf material joined together, the reinforced tape material and an underlying support surface.

The completed seam is illustrated in FIG. 2, wherein the elements of FIG. 1 that are the same, are depicted by the same numerical designation. In FIG. 2, it will be noted that synthetic turf sections 10 and 11 are made up of a multitude of individual ribbons or filaments 14 which are securely anchored into polymeric backing layer 15. Edges 12 and 13 have been abutted together to form a very close seam with reinforcing tape 16 disposed thereunder. By action of the solvent, as described above, that portion of polymeric coating 15 and polymeric coating 18 have been dissolved and have bonded together whereby there is no boundary between the two. In fact, the portion of polymeric coating 15, along the back of synthetic turf sections 10 and 11 and polymeric coating 18, along the top portion of reinforcing tape 16, have been fused together to form one continuous section of polymer that is at least as strong as the original synthetic turf material in the area of the edges in question.

By virtue of the reinforcing filaments 17, beneath the above-mentioned seam, the resulting seam is sufficiently strong to undergo the stresses and strains of athletic activity.

As is known in the art, such polymeric backing materials as polyvinyl chloride and the like, exhibit a high degree of resistance to the ravages of the elements, such as water, temperature fluctuations and sunlight. Therefore, by using a synthetic turf material having a polyvinyl chloride polymeric backing and by using a polyvinyl chloride coated reinforced tape material, it is possible to produce a seam that is attractive and yet will have no holes or voids in such seam to allow water to penetrate through the seam. By the proper selection of a solvent that will soften and dissolve the polymeric backing along the underside of the abutted edges of the synthetic turf sections and to soften and dissolve the polymeric coating along the top of the reinforced tape material, a fusion can be accomplished whereby there is one continuous polymer layer with no discernable boundaries between the original lower edges of the synthetic turf sections and the upper surface of the reinforcing tape material. This, of course, results in a waterproof seam and with the reinforcing effect obtained by reinforcing filaments 17, positioned within reinforcing tape 16, the seam has extremely good strength properties.

In the instant invention, the synthetic turf materials can be installed with the instant seams over rigid support structures such as asphalt, concrete, wood and the like, or they can be conveniently installed over pads or layers of cushioning material. Conventional methods for affixing the entire synthetic turf material to the underlying support structure can be utilized with the instant seaming technique. As illustrated in FIGS. 1 and 2, the turf material has been installed over a layer of asphalt or concrete 19.

In the preferred embodiments of this invention, the polymeric backing of the synthetic turf material will be a backing that will resist the elements, in outdoor installation, as well as a backing that has good strength properties and dimensional stability. One particularly preferred type of polymeric backing is a backing of polyvinyl chloride. Polyvinyl chloride has been found to be exceptionally good as a backing for synthetic turf materials that have been produced by a tufting process whereby the individual filaments or ribbons of the turf material are punched into a base and the polyvinyl chloride is utilized to hold the tufted material in placed. Also, in the preferred embodiments of this invention, the reinforcing tape material will be a tape material that is coated with polyvinyl chloride, having substantially the same physical properties as the polymeric coating along the backside of the synthetic turf material to be joined. While many different types of reinforcing filaments may be utilized in the reinforcing tape structure, it has been found that polyvinyl chloride-coated nylon fabric or belting produces an exceptionally strong bond when it is installed in the instantly described seam. Therefore, polyvinyl chloride-coated nylon fabric is the preferred type of reinforcing tape.

The solvent system that can be utilized in the installation of the instantly described seams can be any volatile solvent system that will wet and dissolve the polymeric coating on the back side of the synthetic turf material and the surface of the reinforcing tape. The solvent system should have sufficient volatility where it will evaporate from the locale of the seam within a reasonable period of time. Solvents that are overly volatile should be avoided because they are normally dangerous to handle and it is difficult to properly position the synthetic turf materials and the reinforcing tape and apply the necessary pressure before the solvents evaporate. In some instances, it may be desirable to apply some type of external heat to the locale of the seam to assist in the evaporation of the volatile solvent, especially in cold, damp installations.

In some instances, it is preferred to utilize a solvent system that is made up of a mixture of solvent material. It has also been found desirable to utilize a somewhat thickened solvent because it is easier to apply such a thickened solvent to the reinforcing tape and the back sides of the synthetic turf material to be joined together.

In such instances, thickening agents, thicksotropic agents and the like, can be added to the solvent system. It has been found particularly preferred to utilize a solvent system that has some dissolved polymer therein to form a thickened solvent system. In such instances, such as in the joining together of polyvinyl chloride coated reinforcing tapes and polyvinyl chloride backed synthetic turf materials, a solvent system having some dissolved polyvinyl chloride therein to render it thick or syrupy, is especially desirable.

The solvent system can be applied to either the surface of the reinforcing tape adjacent the synthetic turf materials, or it can be applied to the polymeric backing of the synthetic turf materials, or to both of these as the seam is about to be formed. Any convenient method can be utilized for applying the solvent system to form the instant seam. It has been found particularly preferred that, in the laying of large areas of synthetic turf material, that the synthetic turf material can be cut and placed into proper edge abutting relationship first and then the tape material can be properly positioned by folding back portions of the edge of the material. Thereafter, the solvent system can be applied to the locale of the seam to be formed. Any convenient method for applying the solvent system, such as by painting, spraying, or trowling the solvent onto the surfaces, can be utilized. One particularly preferred method for applying the solvent is to utilize a pressurized solvent application head that can fit between the abutted edges by slightly folding back the edges and dispensing the solvent through a solvent dispensing head that can be pulled along the upper surface of the reinforcing tape. Thus, the solvent system can be dispensed under pressure in a controlled and regulated manner to dispense just the correct amount of solvent necessary to form the seam. As the solvent dispensing head is drawn along the seam to be formed, a suitable roller can be rolled along the upper surface of the synthetic turf material to apply the desired force to thereby urge the abutted edges into contact with the reinforcing tape, with the solvent system eliminated therebetween.

As previously mentioned, the synthetic turf materials that can be joined together with the instant invention include all of the known synthetic turf materials that have a polymeric backing that is capable of being dissolved by a suitable solvent. The manufacture of such synthetic turf materials is well known in the art and does not comprise a part of this invention. Also, as previously mentioned, synthetic turf materials having a polymeric backing that is comprised essentially of polyvinyl chloride is particularly preferred. Also, as previously mentioned, the reinforcing tape material can be any tape material known in the art that has a polymeric coating that is capable of being dissolved by a solvent that will also dissolve the polymeric backing on the synthetic turf material to be joined together. Thus, polyvinyl chloride coated reinforcing tape materials are particularly preferred. It has been found that polyvinyl chloride coated nylon possesses certain strength and dimensional stability properties that are superior to other types of known reinforcing tapes.

The solvent system utilized in the instant invention can be compounded by those skilled in the art whereby the solvent has sufficient volatility to evaporate from the seam in a reasonable period of time. Mixtures of solvents can be utilized. One particularly preferred solvent system for use in joining together synthetic turf materials having a polyvinyl chloride backing utilizes tetrahydrofuran. The tetrahydrofuran can also be mixed with other consolvents such as dimethylformamide. In some instances, it may be desirable to utilize other types of solvents in conjunction with tetrahydrofuran or dimethylformamide. Methyl-ethyl-ketone can be utilized in conjunction with tetrahydrofuran or dimethylformamide. In some instances, methyl-ethyl-pyrolodone can be substituted for tetrahydrofuran. As previously mentioned, various thickening agents can be incorporated in the solvent system if desired. It has been found that a mixture of about fifty percent tetrahydrofuran, forty-five percent dimethylformamide and about five percent by weight methyl-ethyl-ketone is an excellent solvent system for installing synthetic turf materials under a wide variety of temperature and humidity conditions out of doors. In such instances where the above-mentioned solvent system is utilized, it is normally first mixed with polyvinyl chloride to form a thick, or syrupy, mixture, as will be achieved by mixing about 100 parts by weight of the solvent with at least about ten parts by weight of solid polyvinyl chloride. Naturally, it may be advisable to add certain coloring agents to the solvent system, especially when the polymer backing material of the synthetic turf components or the polymer coating on the reinforcing tape has a color different from the filament or ribbon color of the synthetic turf. Preferably, it is desired to have essentially the same color but, in those instances where the color differs, the colored solvent system can be matched to the color of the filament or ribbons of the synthetic turf material whereby any dissolved polymer that may extrude upwardly through the seams, during application, will not be noticeable.

In the application of the solvent system as mentioned above, it will, of course, be appreciated that dirt, dust, moisture and the like, should be cleaned from the surfaces to be fused together prior to the application of the solvent. The solvent system can be readily compounded by those skilled in the art to provide a solvent system that can be utilized under virtually any temperature conditions that could be reasonably expected during the installation of the seams. Therefore, this invention represents a distinct advance in that prior art methods of chemically bonding or sealing synthetic turf material to form seams were severely limited by temperature and humidity conditions.

Various changes and modifications may be made in the foregoing description and disclosure without departing from the spirit and scope of this invention.

I claim:
1. A seam structure formed by:
  (a) abutting the edges to be joined together;
  (b) positioning a reinforced tape beneath the abutted edges of said synthetic turf material, said reinforced tape being fabric coated with a polymeric material substantially the same as the backing on said synthetic turf material;
  (c) applying a solvent for said polymeric material along at least a portion of said reinforced tape adjacent the abutted edges of said synthetic turf material;
  (d) applying a force along at least a portion of the abutted edges of said synthetic turf material to thereby urge said abutted edges into contact with said reinforced tape;
  (e) allowing at least a portion of said solvent to evaporate while said abutted edges are in contact with said tape material.

2. The seam structure of claim 1 wherein said polymeric material forming said backing of said synthetic turf material and the coating of said reinforced tape is essentially a polyvinyl chloride material.

3. The process of claim 2 wherein said solvent includes tetrahydrofuran.

4. A method of forming a seam between edges of a synthetic turf material having a polymeric material backing thereon which comprises:
   (a) abutting the edges to be joined together;
   (b) positioning a reinforced tape beneath the abutted edges of said synthetic turf material, said reinforced tape being fabric coated with a polymeric material substantially the same as the backing on said synthetic turf material;
   (c) applying a solvent for said polymeric material along at least a portion of said reinforced tape adjacent the abutted edges of said synthetic turf material;
   (d) applying a force along at least a portion of the abutted edges of said synthetic turf material to thereby urge said abutted edges into contact with said reinforced tape; and
   (e) allowing at least a portion of said solvent to evaporate while said abutted edges are in contact with said tape material.

5. The method of claim 4 wherein said synthetic turf material is a tufted material.

6. The method of claim 4 wherein said polymeric material forming said backing of said synthetic turf material and the coating of said reinforced tape is essentially a polyvinyl chloride material.

7. The method of claim 6 wherein said solvent includes tetrahydrofuran.

8. The method of claim 7 wherein polyvinyl chloride is dissolved in said solvent to thicken said solvent prior to applying it to said reinforced tape.

9. The method of claim 6 wherein said reinforced tape is coated with polyvinyl chloride.

10. The method of claim 9 wherein said reinforced tape is a nylon fabric coated with polyvinyl chloride.

* * * * *

UNITED STATES PATENT OFFICE
CERTIFICATE OF CORRECTION

Patent No. 4,152,473    Dated  May 1, 1979

Inventor(s) Bruce W. Layman

It is certified that error appears in the above-identified patent and that said Letters Patent are hereby corrected as shown below:

Column 1, line 43, "is" should be --in--

Column 6, line 34, "placed" should be --place--

Column 8, line 52, Claim 1, after "abutting", insert --together--

Column 8, line 52, Claim 1, after "edges", insert --of synthetic turf material--

Column 8, line 52, Claim 1, delete "together"

Signed and Sealed this

Seventeenth Day of July 1979

[SEAL]

Attest:

LUTRELLE F. PARKER

Attesting Officer    Acting Commissioner of Patents and Trademarks